April 28, 1953 — M. A. GOODBAR ET AL — 2,636,435
MECHANISM TO CONTROL THE PRINTING AND PAPER
HANDLING EQUIPMENT OF ACCOUNTING MACHINES
Filed Jan. 28, 1950 — 3 Sheets-Sheet 1
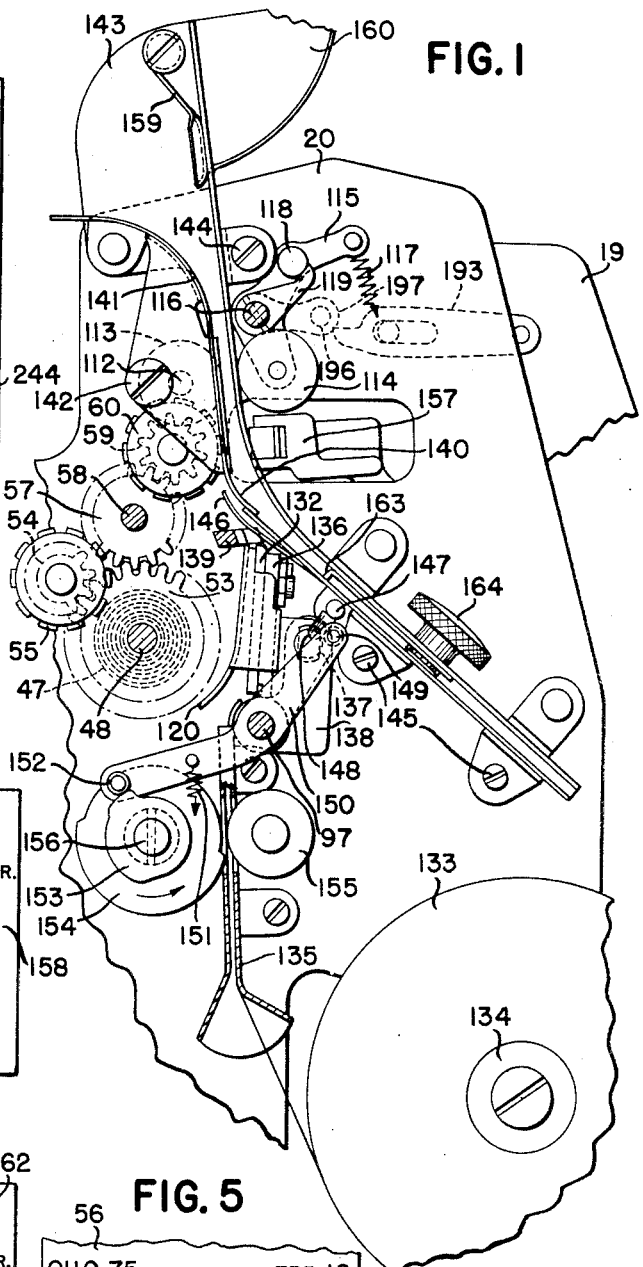
INVENTORS
MAYO A. GOODBAR
& RUSSELL G. PRATT
BY Earl Beust
Richard Van Buren
THEIR ATTORNEYS April 28, 1953 M. A. GOODBAR ET AL 2,636,435
MECHANISM TO CONTROL THE PRINTING AND PAPER
HANDLING EQUIPMENT OF ACCOUNTING MACHINES
Filed Jan. 28, 1950 3 Sheets-Sheet 2

INVENTORS
MAYO A. GOODBAR
& RUSSELL G. PRATT

BY Carl Beust
Richard Van Buren

THEIR ATTORNEYS

April 28, 1953

M. A. GOODBAR ET AL 2,636,435

MECHANISM TO CONTROL THE PRINTING AND PAPER
HANDLING EQUIPMENT OF ACCOUNTING MACHINES

Filed Jan. 28, 1950

INVENTORS
MAYO A. GOODBAR
& RUSSELL G. PRATT

BY Earl Beust
Richard Van Busum

THEIR ATTORNEYS

Patented Apr. 28, 1953

2,636,435

UNITED STATES PATENT OFFICE 2,636,435

MECHANISM TO CONTROL THE PRINTING AND PAPER HANDLING EQUIPMENT OF ACCOUNTING MACHINES

Mayo A. Goodbar, Oakwood, and Russell G. Pratt, Dayton, Ohio, assignors to The National Cash Register Company, Dayton, Ohio, a corporation of Maryland Application January 28, 1950, Serial No. 140,999

7 Claims. (Cl. 101—93)

This invention relates to accounting machines and is particularly directed to improvements in the printing and record material handling equipment of such machines.

Broadly, it is an object of this invention to provide a small, compact, and efficient accounting machine for use in banking establishments and analogous businesses where funds are accepted for credit to the accounts of customers.

Another object is the provision of improved record material handling equipment for machines of the character referred to above.

A further object of this invention is to provide a machine of the type referred to above for simultaneously printing similar data upon an issuing receipt or ticket and upon an insertable slip.

A further object is to provide a machine of the character referred to above, constructed and arranged to print similar data upon an issuing receipt and upon an insertable slip, with means to control the printing and issuing means to effect the desired results.

With these and incidental objects in view, the invention includes certain novel features of construction and combinations of parts, a preferred form or embodiment of which is hereinafter described with reference to the drawings which accompany and form a part of this specification.

In the drawings:

Fig. 1 is a fragmentary right side elevation of the upper portion of the machine, showing in particular the record material printing and handling equipment.

Fig. 2 is a facsimile of an insertable slip prepared on the machine of this invention.

Fig. 3 is a facsimile of a receipt or ticket which is prepared and issued at the same time the slip shown in Fig. 2 is prepared.

Fig. 4 is a facsimile of another type of ticket printed and issued by the machine.

Fig. 5 is a fragmentary portion of the detail strip which is retained in the machine and which carries a duplicate record of every transaction performed by the machine.

GENERAL DESCRIPTION

Figure 6:
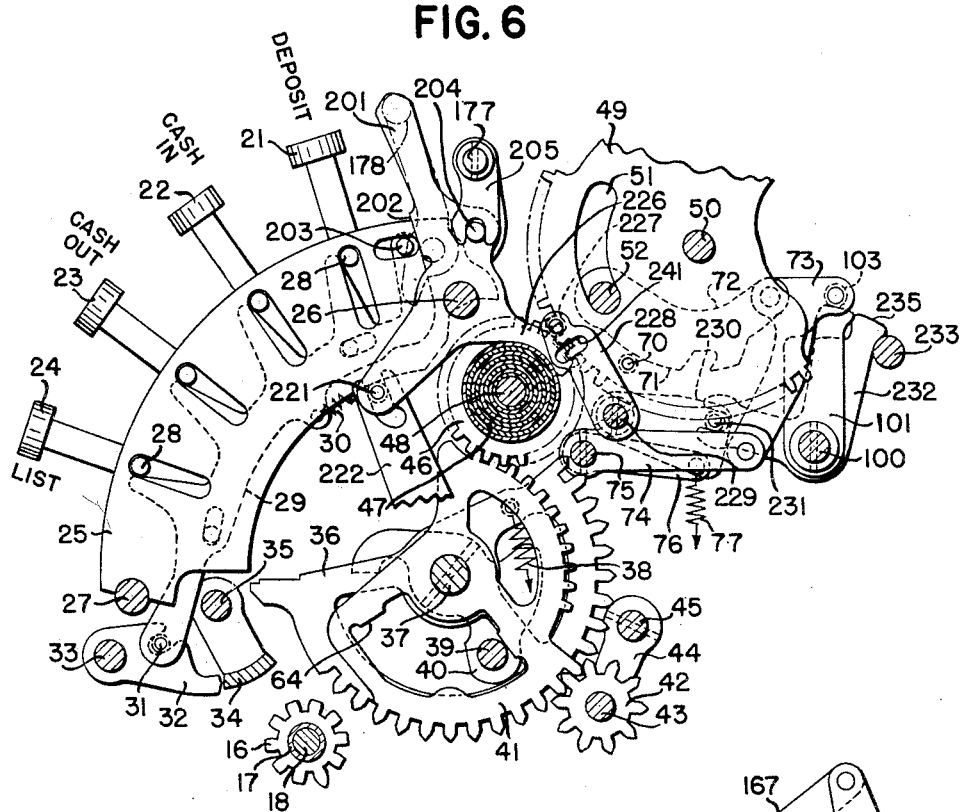
Fig. 6 is a right side elevation of the bank of transaction control keys and the differential mechanism associated therewith.

The present invention is shown incorporated in a compact and efficient accounting machine or cash register of light weight and small dimensions having all the features and appointments of larger and more complicated machines which are used in a similar capacity. This machine is of a well-known type, the main features of which are fully disclosed in United States Patents Nos. 1,795,509, 1,929,652, and 2,056,485, issued, respectively, March 10, 1931, October 10, 1933, and October 6, 1936, to William H. Robertson. Reference may be had to the above patents for a full disclosure of mechanism which is not pertinent to the present invention and which will be described only in a general way herein.

The machine chosen to illustrate the present invention is disclosed as adapted for use by tellers in banking establishments in the handling of funds in connection with deposits, withdrawals, and the cashing of checks. Primarily, the machine is arranged for use in connection with checking accounts but is well adapted for use in connection with savings and other banking accounts. However, it is neither the intention nor the desire to limit the machine to any particular use, as it is ideally suited for use in any business where funds are accepted for credit to the accounts of patrons or customers.

The mechanism of the machine is enclosed in a suitable case or cabinet which provides proper protection to said mechanism and at the same time enhances the appearance of the machine. The keyboard of the machine comprises a full complement of denominational rows of numeral or amount keys, each order being provided with a differential mechanism, the primary member of which coacts with the lower end of the depressed keys and with the corresponding wheels of four interspersed totalizers with which the machine is provided. Each differential mechanism includes a secondary differential member, positioned by the corresponding primary member, which in turn positions the corresponding ones of two sets of printing wheels and the corresponding indicators.

The four interspersed totalizers are selected for engagement with the amount actuators by four corresponding transaction keys, which are located near the right-hand side of the keyboard adjacent to the lowest order row of amount keys, and depression of said transaction keys alines the corresponding set of totalizer wheels with the amount actuators for actuation thereby during machine operation.

Located immediately to the right of the transaction keys is a "Total Control Lever," which controls the engagement and disengagement of the selected set of totalizer wheels with and from the amount actuators in adding, reading, and resetting operations.

In adding operations, the differential devices are positioned by the corresponding amount keys to the values thereof, after which the selected totalizer is engaged with the primary members of said differential devices, and the amount is simultaneously added in the selected totalizer and set up on the printing wheels and the indicators. The secondary members of the differential devices and the corresponding printing wheels and indicators remain in set positions at the end of machine operation and in the succeeding operation are first reset to zero position and then moved to their new positions. In reading and resetting operations, the wheels of the selected totalizer are engaged with the primary differential members and position said members and the corresponding secondary members in accordance with the amount standing on said totalizer wheels, said secondary members in turn positioning the printing wheels and the indicators accordingly.

Located on the left-hand side of the keyboard adjacent the highest order row of amount keys is a "Repeat" key for controlling the repeating of the amount of the previous operation and with this type of repeat mechanism it is not necessary for the operator to know beforehand that the amount of a previous operation is to be repeated in the immediately succeeding operation.

One of the two sets of printing wheels with which the machine is provided is arranged to print values and other data upon a detail audit strip, which is retained in the machine, and the other set of printing wheels is arranged to print values and other data upon an issuing receipt or ticket, and also upon an insertable slip, when desired.

It is to be noted that the present machine is arranged to print the data relating to a transaction upon an issuing ticket, upon an insertable slip, and upon the detail strip in the same operation.

The present machine is provided with two manually operable levers for controlling the functioning of the machine in certain types of operations. One of these levers, which is known as a "Duplicate Deposit Lever," is used to control the operation of the machine when it is desired to prepare a duplicate deposit slip having thereon the identical data printed on the original deposit slip in the preceding operation. The other control lever is termed a "Listing Lever" and is used in conjunction with the List transaction key for controlling the functioning of the machine mechanism in listing operations, in which a series of related items are entered in one of the totalizers of the machine and simultaneously recorded upon the detail strip.

The operating mechanism of the machine comprises a main cam shaft, which makes one revolution for each adding, reading, and resetting operation. A normally ineffective clutch mechanism connects the main cam shaft to the small electric operating motor, and the usual starting bar, which is located on the right-hand side of the keyboard, is provided for rendering the clutch mechanism effective and simultaneously closing the electric switch which sets the motor in operation. At the end of machine operation, the clutch mechanism is automatically disengaged, the electric switch is opened, and the starting bar is restored to unoperated position. A hand crank is provided for manually operating the machine whenever necessary or desirable due to the failure or absence of electric power. In the present machine, depression of the "Repeat Key" initiates machine operation in exactly the same manner as the depression of the starting bar.

At the end of machine operation, all of the depressed amount keys and the depressed transaction key, with the exception of the "List" key, are automatically released and restored upwardly to undepressed position. In the present adaptation, the "List" transaction key is a stay-down key and can be released only by depression of some other transaction key in a subsequent operation. A manually operable key release mechanism is provided for manually releasing any depressed amount or transaction keys, with the exception of the "List" transaction key.

The machine is provided with six special counters visible through corresponding apertures in the lower front portion of the machine case. Four of the special counters correspond to the four totalizers and accumulate "one" each time the corresponding totalizer is selected for an adding operation, and the fifth special counter counts "one" each time any totalizer is selected for an adding operation, thus accumulating a total of the combined amounts on the previously mentioned four special counters. The above five special counters may all be reset to zero at the same time by an authorized person having a key to the lock which controls the resetting of these counters. The sixth special counter counts "one" each time the machine performs a resetting or totalizing operation, and this counter cannot be reset.

The printing mechanism of the machine is provided with a consecutive number mechanism which advances one increment each machine operation, with the exception of certain machine operations, as will be explained later, and prints a consecutive number upon the detail audit strip, the issuing ticket, and the insertable slip.

The mechanism described in general above, which is pertinent to the present invention, will be described in detail in the ensuing pages.

DETAILED DESCRIPTION

Operating mechanism and keyboard

The main mechanism of the machine is supported by and between two similar side frames, only the right frame 19 being shown here (Fig. 1), said frames in turn being secured to a machine base (not shown) in properly spaced relationship to each other. The printing mechanism is supported by a framework including a main printer frame 20, secured to the right frame 19.

As explained in the General Description, the machine has a full complement of amount keys, not shown in this application but fully disclosed in the patents referred to at the beginning hereof. Located just to the right of the amount keys are four transaction keys (Fig. 6) 21, 22, 23, and 24, mounted in a key frame 25 removably retained in the machine by rods 26 and 27, supported by the main frames of the machine.

Depression of one of the transaction keys 21 to 24 causes a stud 28 carried thereby, in cooperation with a corresponding camming finger on a control plate 29 slidably mounted in the frame 25, to shift said plate downwardly against the tension of a spring 30. Downward movement of the plate 29 causes a stud 31 in its lower end, in cooperation with a slot in an arm 32, to rock said arm downwardly or clockwise to move a rearwardly extending finger thereof out of the path of the bail of a yoke 34 free on a shaft 35 supported by the main frames. The arm 32 is rotatably supported on a key release shaft 33, in turn supported by the main frames. Moving the arm 32 (Fig. 6) to ineffective position frees the yoke 34 for clockwise releasing movement, after which machine operation may be initiated in the usual and well-known manner, as fully explained in the Robertson Patent No. 2,056,485. Near the end of machine operation, the yoke 34 is restored to normal position, as shown here, and immediately thereafter the depressed transaction key, with the exception of the "List" key 24 (Fig. 6), which is a stay-down key, is released and restored upwardly to normal position. This frees the plate 29 and the arm 32 to the action of the spring 30, which returns said arm into the path of the bail of the yoke 34.

*Transaction differential mechanism*

The bank of transaction keys has a differential mechanism similar in every respect to the amount differential mechanism, and depression of one of the keys 21 to 24 (Fig. 6) moves the lower end of its stem into the path of a forward projection of a transaction actuator segment 36, free on a differential shaft 37, supported by the main side frames. A comparatively strong spring 38 urges the segment 36 clockwise to normally maintain a finished surface, in an opening therein, in engagement with a differential operating rod 39, which extends through said opening and which is supported by similar arms 40 (only one shown here) in turn secured to the differential shaft 37. Associated with the actuator segment 36 is a printer and indicator positioning segment 41 free on the shaft 37, said segments 36 and 41 having similar teeth cut in their peripheries, which coact with corresponding teeth in a coupling pinion 42, free on a rod 43, supported between similar arms 44 (only one shown here) in turn secured on a coupling pinion operating shaft 45.

The segment 41 has gear teeth on an undercut portion of its periphery, which mesh with the gear teeth in a printer positioning gear 46 connected to the corresponding one of a series of nested tubes 47, in turn secured on a shaft 48, supported in the machine framework. The gear 46 also meshes with teeth in the periphery of a ticket and slip feed control segment 49 free on a shaft 50 journaled in the machine framework. A concentric slot 51 in the segment 49 coacts with a rod 52 supported by the machine framework, to limit the rocking movement of the segment 49 in either direction to prevent overthrow upon fast machine operation. Ordinarily, the segment 49 is connected to and positions corresponding front and back indicators for the transaction keys, but in this case the transaction indicators have been omitted, and said segment functions only to control the feeding of the ticket and the slip, as will be explained later.

The tube 47 (Figs. 1 and 6) for the gear 46 is connected to and drives a corresponding gear 53, which meshes with and drives a corresponding pinion 54, in turn secured to a corresponding type wheel 55, free on a rod supported by the machine framework, for printing records on an audit strip 56, a fragmentary portion of which is shown in Fig. 5. The gear 53 also meshes with and drives an idler gear 57 free on a rod 58 supported in the machine framework, said gear in turn meshing with and driving a pinion 59 integral with a corresponding type wheel 60 free on a rod supported by the machine framework, said type wheel 60 arranged to print records on issuing tickets 61 and 62 (Figs. 3 and 4) and a deposit slip 63 (Fig. 2), as will be explained later.

Near the beginning of machine operation, the shaft 45, the arms 44, and the coupling pinion 42 (Fig. 6) are rocked counter-clockwise to disengage said coupling pinion from the teeth in the segments 41 and 36, whereupon clockwise initial movement of the operating rod 39 causes the spring 38 to carry the actuator segment 36 in unison therewith until the forward extension of said actuator contacts the end of the depressed transaction key 21 to 24, to position said actuator in accordance therewith. Likewise, initial clockwise movement of the rod 39 causes said rod, in cooperation with a raised, finished surface 64, in an opening in the segment 41, through which said rod 39 extends, to pick up said segment and restore it and the mechanism connected therewith from preset position to zero or normal position, in which it is shown in Fig. 6.

After the actuator segment 36 has been positioned by the depressed transaction key, and after the segment 41 has been restored to zero, the clutch pinion 42 is engaged with the teeth in said segments prior to counter-clockwise return movement of the rod 39. During its return movement, the rod 39 picks up the actuator segment 36 and restores it counter-clockwise, against the action of the spring 38, to zero or normal position, as shown here, and, inasmuch as the segment 41 is coupled to said actuator segment, it is returned counter-clockwise in unison therewith and, through the gearing explained above, positions the control segment 49 and the type wheels 55 and 60 (Fig. 1) according to the depressed transaction key, to cause a corresponding symbol to be printed upon the detail strip, the issuing ticket, and the insertable slip.

It is to be noted that the segment 41, the control segment 49, and the type wheels 55 and 60 remain in set positions at the end of machine operation and in the succeeding operation are first restored to zero position and then positioned by the actuator segment 36 according to the depressed transaction key.

At the end of machine operation, the key release shaft 33 is operated, in the usual manner, to release the depressed transaction keys 21, 22, or 23.

As explained in the General Description, the present machine is provided with four sets of totalizer wheels, one set for each of the transaction keys 21–24 (Fig. 6), and depression of said keys, through the mechanism disclosed in the Robertson Patent No. 2,056,485 but not shown herein, alines the corresponding set of totalizer wheels with the amount actuators for actuation thereby, in the usual and well-known manner. A representative totalizer wheel 16 is shown in Fig. 6, said wheel being rotatably supported on a sleeve 17 in turn shiftably mounted on a shaft 18 supported in the usual rockable framework (not shown). The wheel 16 does not coact with the transaction actuator segment 36 but instead coacts with its corresponding amount actuator segment (not shown), which is similar to said segment 36.

Repeat mechanism and total control lever

The present machine is provided with the well-known repeat mechanism, which is fully disclosed in the Robertson Patent No. 1,929,652, for causing the amount of the immediately preceding transaction to be repeated without any foreknowledge on the part of the operator that such amount is to be repeated.

Figure 7:
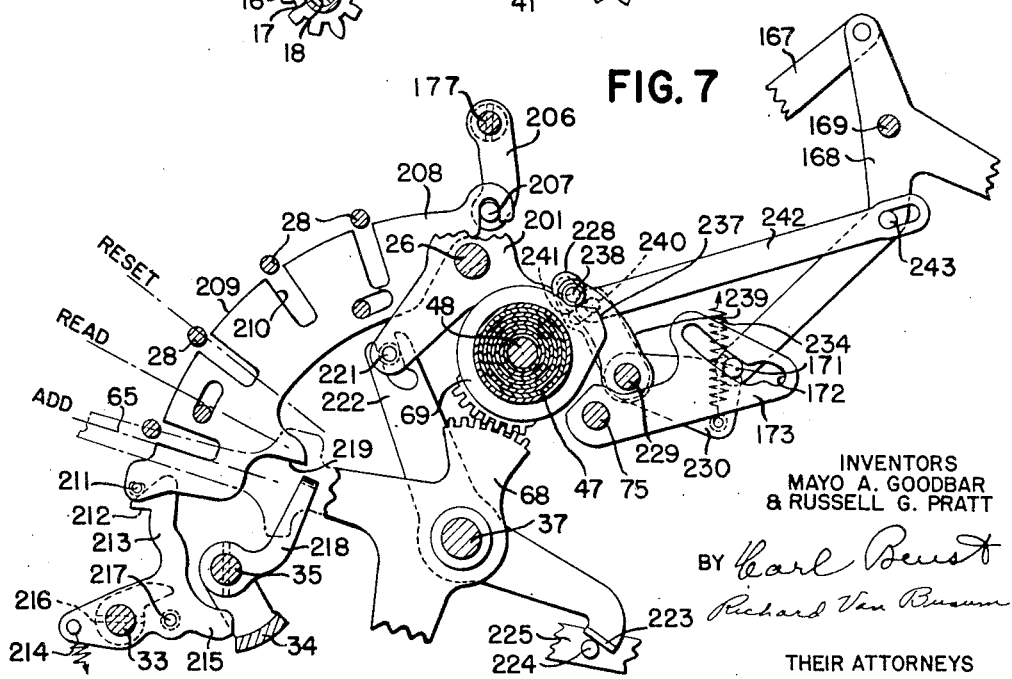
Fig. 7 is a right-hand elevation of a part of the controlling mechanism associated with the transaction bank, shown in Fig. 6.

The present machine is also provided with the usual total control lever 65 (Fig. 7) free on the shaft 37, for conditioning the totalizer-engaging mechanism for adding, reading, and resetting operations. When the total control lever 65 is in Add position, as shown in Fig. 7, the selected set of totalizer wheels is engaged with the teeth in the corresponding amount actuators, after said actuators have been positioned by the depressed amount keys, and return movement of said actuators adds an amount corresponding to the value of said depressed amount keys in said selected set of totalizer wheels. Moving the total control lever one step upwardly to "Read" position causes the selected set of totalizer wheels to be engaged with the corresponding teeth of the amount actuators prior to initial movement of said actuators, which movement rotates said wheels in a reverse direction to zero and positions said actuators according to the amount standing on said wheels. Return movement of the actuators restores said selected set of totalizer wheels to their original positions. Moving the total control lever 65 (Fig. 7) two steps upwardly to "Reset" position causes the wheels of the selected totalizer to be engaged with the amount actuators prior to their initial movement, which movement rotates said wheels in a reverse direction to zero position and positions said actuators and the corresponding type wheels and indicators according to the amount standing on said selected totalizer wheels. In resetting operations, the zeroized wheels of the selected totalizer are disengaged from the amount actuators prior to their return movements, and consequently said wheels remain in a zeroized condition.

The total control lever 65 (Fig. 7) has an upwardly-extending segmental portion 68, with gear teeth which mesh with corresponding gear teeth in a segmental portion of a ticket feed control cam 69, said cam in turn being connected by one of the tubes 47, and gearing similar to that shown in Fig. 1, to two corresponding type wheels (not shown) on the two type wheel lines for printing an identifying symbol on the detail audit strip 56 and the tickets 61 and 62, in reading and resetting operations.

Directing attention to Fig. 6, the control segment 49 carries a stud 70, which coacts with a mutilated sensing surface 71 on a sensing arm 72, free on the rod 52. The upper end of a link 73 is pivotally connected to a rearward extension of the arm 72, while the lower end of said link is pivotally connected to the rear end of an arm 74 secured on a shaft 75 journaled in the machine framework. Also secured on the shaft 75 is a crank 76 having connected thereto one end of a spring 77, which urges said crank, the shaft 75, the arm 74, the link 73, and the arm 72 downwardly or clockwise, as shown here. Also secured on the shaft 75 (Fig. 9) is an arm 78 flexibly connected by a spring 79 to a printer control pawl 80 free on the shaft 75, said spring 79 urging said pawl 80 counter-clockwise to normally maintain it in yielding contact with a stud 81 in an upward extension of a cam lever 82 free on the shaft 75. A foot-shaped extension of the lever 82 coacts with a camming surface 83 on the periphery of a knife-operating cam 84 free on a shaft 85 journaled in the right main frame. Integral with the cam 84 (Figs. 8 and 9) is a driving lug 86, with two shoulders, one of which is normally engaged by a driving pawl 87, and the other of which is normally in the path of a retaining pawl 88, said pawls being pivotally mounted on a plate 89 in turn secured to the right-hand face of a gear 90 free on the shaft 85. The gear, the plate, and the pawls are driven one revolution in a counter-clockwise direction each machine operation by the main operating mechanism.

A spring 91 (Fig. 8), tensioned between the pawls 87 and 88, urges them toward each other to normally maintain said pawls in the path of the corresponding shoulders on the driving lug 86 to form an operating connection between the gear 90 and the cam 84. The cam 84 (Fig. 9) has a cam groove 94 cut in one face thereof, which is engaged by a roller 95 mounted on the forward end of a cam lever 96 secured on a knife-operating shaft 97 in turn journaled in the machine framework. A rearward extension of the lever 96 carries a stud 98 engaged by the slotted forward end of a crank 99 secured on a shaft 100 journaled in the machine framework. Also secured on the shaft 100 is a cam arm 101, having a cam surface 102 on its upper end, which cooperates with a stud 103 fast in the upper end of the link 73.

The pawl 88 (Fig. 9) has a shoulder 104, which cooperates with a bent-over ear 105 on a ticket and slip feed segment 106 free on a series of telescoping tubes 107 in turn rotatably supported by the shaft 58. Teeth in the upper portion of the segment 106 mesh with and drive a pinion 108 integral with a gear 109 free on a stud 110 in the printer framework. The gear 109 meshes with a similar gear 111 secured on the left end of a slip feed shaft 112 journaled in the printer framework. The shaft 112 (Fig. 1) has secured thereon two properly spaced feed rollers 113, which coact with corresponding tension rollers 114 rotatably supported on a corresponding stud secured in the lower end of a corresponding tension lever 115 free on a shaft 116 journaled in the printer framework. Connected to each of the levers 115 is a corresponding spring 117, which urges said levers and their corresponding tension rollers 114 counter-clockwise to normally maintain a stud 118, carried by each of said levers, in yielding engagement with a corresponding operating finger 119 secured on the shaft 116. A downward portion of the segment 106 has teeth which mesh with corresponding teeth in a segmental portion of a cam lever 121 free on a stud 122 secured in the main right frame. A downward extension of the lever 121 carries a roller 123, which cooperates with the periphery of a plate cam 124 free on a stationary stud 125 and driven one counter-clockwise revolution each machine operation by the main operating shaft (not shown), to which it is connected by a series of gears.

Figure 9:
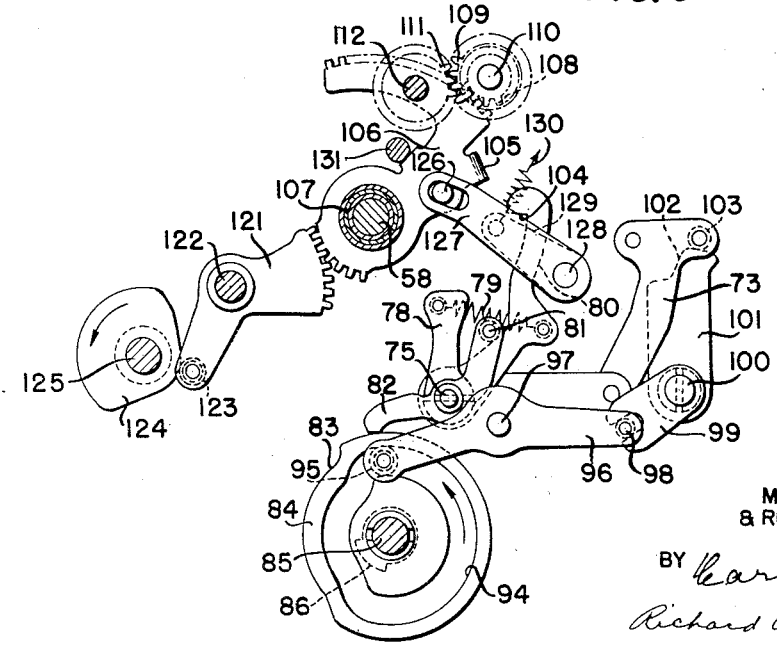
Fig. 9 is a detail view of a portion of the mechanism for controlling the advancing or feeding of the record material under certain conditions.

Referring to Fig. 9, the segment 106 carries a stud 126, which engages a slot in the forward end of an arm 127 free on a fixed stud 128 and connected by a hub to a companion spring arm 129, having connected thereto the lower end of a comparatively strong spring 130, which, through said arms 129 and 127, urges the segment 106 counter-clockwise into yielding engagement with a fixed stop stud 131.

It will be seen by referring to Fig. 1 that the supply of ticket material is in the form of a roll 133 rotatably supported on a stud 134 secured to the printer frame 20, and that the web of said ticket material is fed through the enlarged mouth of a lower guide chute 135 secured to the printer framework. The web of the ticket material is advanced upwardly through the upper end of the chute 135 into the enlarged mouth of a knife guide chute 120, the side members of which straddle a knife blade 132 and are secured to a rockable knife frame 136, free on the shaft 97. An eccentric stud 137 adjustably connects the frame 136 to an operating arm 138 secured on the knife operating shaft 97. The blade 132 is shiftably supported in the frame 136, and the usual spring means is provided for urging said blade upwardly to normally maintain its cutting edge in yielding engagement with the lower surface of a stationary shearing knife blade 139 supported in the printer framework in the well-known manner. The path of the web of the ticket material continues upwardly through the opening in the upper end of the chute 120, thence through a throat 140 formed in the front member 141 of an upper guide chute 143, said member 141 and the other members of the chute 143 being maintained in proper spaced relationship to each other and properly secured in the printer framework by various bent-over ears thereon, in cooperation with corresponding studs, rods, and screws 142, 144, and 145 (Fig. 1).

Normally, the web of the record material 133 is prevented from entering the throat 140 by a slip retaining plate 146, secured on a shaft 147 journaled in bent-over ears in the lower portion of the chute 143. Secured on the shaft 147 is a stud 148, which coacts with a stud 149 in the upper arm of a lever 150 free on the shaft 97. A forward arm of the lever 150 carries a roller 152 urged counter-clockwise by a spring 151 into yielding engagement with the camming periphery of a plate cam 153 fast on a shaft 156, to which is also secured a ticket feed cylinder 154. The shaft 156 is mounted in axial alinement with the shaft 95 (Figs. 1 and 9), the inner end of said shaft 156 freely engaging the bore in the hub of the cam 84, and a bearing portion of the cylinder 154 being journaled in a removable bushing (not shown) secured to the printer framework. A driving connection is effected between the cylinder 154 and the cam 84 by clutch tenons on said cylinder, which engage corresponding clutch cuts in the hub of said cam 84.

When the machine is in home position, as shown in Fig. 1, a high portion of the periphery of the cam 153, in cooperation with the roller 152, retains the lever 150 in its clockwise position, as shown here, in which position the plate 146 obstructs the throat 140 of the chute 143. At the very beginning of machine operation, counter-clockwise movement of the cam 153 causes the high portion to move off of the roller 152, whereupon the spring 151 rocks the lever 150 counter-clockwise, causing said lever in turn to rock the plate 146 clockwise through the throat opening 140, and into yielding engagement with the rear wall of the chute 143. Immediately after the plate 146 has been rocked inwardly to open the throat 140, twin feed rails on the feed cylinder, rotating in unison with the cam 84, impinge the web of the ticket material 133 against the periphery of a resilient feed roller 155, rotatably supported in the printer framework, and feed said web upwardly through the open throat 140 and into the channel of the chute 143. The feed rails of the cylinder 154 are of proper length to feed the desired length of the web 133 upwardly past the cutting edges of the blades 132 and 139 and between the feed rollers 113 and the pressure rollers 114, said pressure rollers being in their open position, as shown in Fig. 1, at this time. Located between the feed rails and secured to the periphery of the cylinder 154 is the usual electro printing plate, which during rotation of said cylinder prints data of a descriptive or instructive nature upon the face of the tickets 61 and 62 (Figs. 3 and 4).

Immediately after the cylinder 154 (Fig. 1) has completed the feeding of the web 133, the shaft 116 and the fingers 119 are rocked clockwise, permitting the springs 117 to rock the levers 115 and the pressure rollers 114 in unison therewith, causing said rollers to carry the upper end of said web 133 into yielding engagement with the feed rollers 113. Immediately after the web of the ticket material is secured between the rollers 113 and 114, the movable knife blade 132 (Fig. 1) is rocked clockwise and, in cooperation with the stationary blade 139, severs the ticket from the web. Concurrently with the operation of the knife 132, an impression hammer 157 makes its first impression stroke to print the data indicated at 158 (Fig. 3) upon the ticket 61. At the same time the first impression is made upon the ticket, an impression hammer (not shown) for the detail audit strip 55 (Fig. 5) functions to print a duplicate of the data upon said strip. Immediately after the impression hammer 157 has been retracted after completing its first impression stroke, the declining periphery of the cam 124 (Fig. 9) permits the spring 136 to return the segment 106 counter-clockwise, which movement drives the feed rollers 113 (Fig. 1) counter-clockwise to feed the severed ticket upwardly.

As previously explained, the feeding counter-clockwise movement of the segment 106 is determined by the control pawl 80 (Fig. 9), and, if the "Deposit" transaction key 21 (Fig. 6) or the "Cash Out" transaction key 23 is depressed, the stud 79 is positioned opposite an undercut portion of the periphery of the control arm 72. Consequently, the arm 72 and the parts connected thereto are free to move full distance clockwise, upon operation of the cam arm 101, as explained earlier herein. In this case, movement of the arm 78 (Fig. 9), in cooperation with the stud 81, retains the control pawl 80 in its ineffective or clockwise position, as shown here, and, as a result, counter-clockwise return movement of the feed segment 106 is not interrupted and the ticket is fed full distance upwardly before the second impression stroke of the hammer 157. It is to be understood that the ticket is printed upside down, and, as the upper edge of said ticket is disposed downwardly, it will be fed beyond the printing line before the second impression stroke of the hammer 157; consequently, in this instance, only the one impression shown at 158 will be made upon said ticket. When the finished ticket is fed upwardly, the upwardly-disposed edge thereof is moved between a spring-actuated retaining finger 159 (Fig. 1) and the inner surface of the chute 143, to retain said ticket within convenient reach of the operator, when the pressure rollers 114 are rocked counter-clockwise to open or ineffective position, near the end of the machine operation. A recess 160 in the upper portion of the chute 143 exposes the right-hand corner of the ticket, so that it may be readily grasped by the operator and removed from the machine.

In machine operations where either the "Cash-In" transaction key 22 (Figs. 6 and 9) or the "List" transaction key 24 is depressed, the stud 70 is positioned opposite a high portion of the control surface 71 on the arm 72, and, as a result, clockwise movement of said arm and the parts connected thereto is obstructed, and this permits the spring 79 to move the control pawl 80 counter-clockwise to effective position, when the low portion of the camming surface 83 is moved opposite the foot of the lever 82. As explained before, this counter-clockwise movement of the pawl 80 occurs after the segment 106 has been rocked clockwise to full cocked position; consequently, the shoulder 104 of said pawl is moved into the path of the ear 105 on said segment. In this case, a ticket similar to that shown in Fig. 4 will be issued, and the first impression stroke of the hammer 157 prints the data indicated at 161 near the central portion of the ticket 62.

After the first impression has been made upon the ticket and the hammer has been retracted, counter-clockwise feeding movement of the segment 106 carries the inverted ticket 62 upwardly until the ear 105 engages the shoulder 104 on the pawl 80 to stop segment 106 and position the upper portion of said ticket on the printing line, whereupon the second operation of the hammer 157 prints the data indicated at 162 near the upper edge thereof. Simultaneously with the printing of the data upon the ticket 62, the hammer for the detail strip 56 (Fig. 5) functions to print similar data upon the second line of said detail strip. As the cam 84 (Fig. 9) nears home position, the camming surface 83 on its periphery rocks the lever 82 clockwise, causing the stud 81 to carry the pawl 80 clockwise in unison therewith to disengage the shoulder 104 from the ear 105 to release the segment 106 to the action of the spring 130, which immediately restores said segment the remaining distance counter-clockwise to home position to eject the completed ticket.

In certain types of machine operations where only one impression is required upon the ticket, as shown in Fig. 3, it is desirable that the other or duplicate impression be made upon an insertable slip, similar to the slip 63 (Fig. 2). In such cases, prior to machine operation, the slip 63 is inserted upside down in the mouth of the chute 143 (Fig. 1) and moved into contact with the bent-over upper edge of a locating bar 163, situated within said chute 143 and adjustable by means of a slot in said chute and clamping screw 164, to locate said slip 63 in proper relationship to the type wheels 60 and the impression hammer 157. At the beginning of machine operation, the cam 153 (Fig. 1) releases the lever 150 to the action of the spring 151, which immediately rocks said lever counter-clockwise, whereupon said lever rocks the plate 146 clockwise and said plate in turn carries the inserted slip 63 into yielding engagement with the inner surface of the chute 143 to retain said slip against displacement until it is gripped by the rollers 113 and 114. In addition to holding the slip 63 against displacement, the plate 146, as previously explained, upon its clockwise movement, opens the throat 140 to the chute 143, to permit the ticket material 133 to be fed therein and further to insure that the feeding of said ticket material does not disturb the position of said slip in said chute. After the completion of the upward feeding movement of the ticket material, the pressure rollers 114 become effective, as explained previously, to hold said ticket material and the inserted slip 63 against the feed rollers 113, prior to severing movement of the knife 132.

As the ticket is being severed, the first impression stroke of the hammer 157 (Fig. 1) prints the data indicated at 158 (Fig. 3) upon said ticket, after which the ticket feeding mechanism (Fig. 9) functions to feed said ticket and the slip 63 upwardly to locate the inverted upper edge of said slip in proper relationship to the printing line and to move the ticket 61 beyond said printing line. The second printing stroke of the hammer 157 causes the data printed upon the ticket 61 to be duplicated upon the upper edge of the slip 63, as shown in Fig. 2, and immediately thereafter, and just before the end of machine operation, the pressure rollers 114 are rocked counter-clockwise to ineffective position so that the completed ticket and slip may be removed from the chute 143.

In certain types of operations, it is desirable that both of the impressions be made upon the slip 63 (Fig. 2), and in this case the cylinder 154 for feeding the ticket material is disabled by moving the driving pawl 87 (Fig. 8) for said cylinder to ineffective position. Normally, the mechanism is effective for moving the driving pawl 87 to ineffective position. However, depression of any one of the transaction keys 21, 22, or 23 causes the stud 28 therein, in cooperation with a corresponding camming surface 165 on a control slide 166 shiftably mounted in the key frame 25 for the control bank, to shift said slide downwardly or counter-clockwise. The slide 166 is pivotally connected by a link 167 to a lever 168 free on a shaft 169 journaled in the machine framework. A downwardly-extending arm of the lever 168 carries a stud 171, which cooperates with a cam slot 172 in an arm 173 free on the shaft 75 and connected by a hub to a companion arm 174 carrying a stud 175, which coacts with an upwardly-extending finger 176 of the driving pawl 87. A spring 170, connected at its upper end to a rearwardly-extending arm of the lever 168, urges said lever clockwise, which, through the link 167, also urges the control slide 166 clockwise to normally maintain the camming surfaces 165 thereon in yielding engagement with the studs 28. Counter-clockwise movement of the control slide 166, upon depression of one of the transaction keys 21, 22, or 23 (Fig. 8), through the link 167, imparts similar movement to the lever 168 against the action of the spring 170. Counter-clockwise movement of the lever 168 causes the stud 171, in cooperation with the slot 172, to rock the arms 173 and 174 clockwise to move the stud 175 upwardly out of the path of the finger 176 on the pawl 87.

Figure 8:
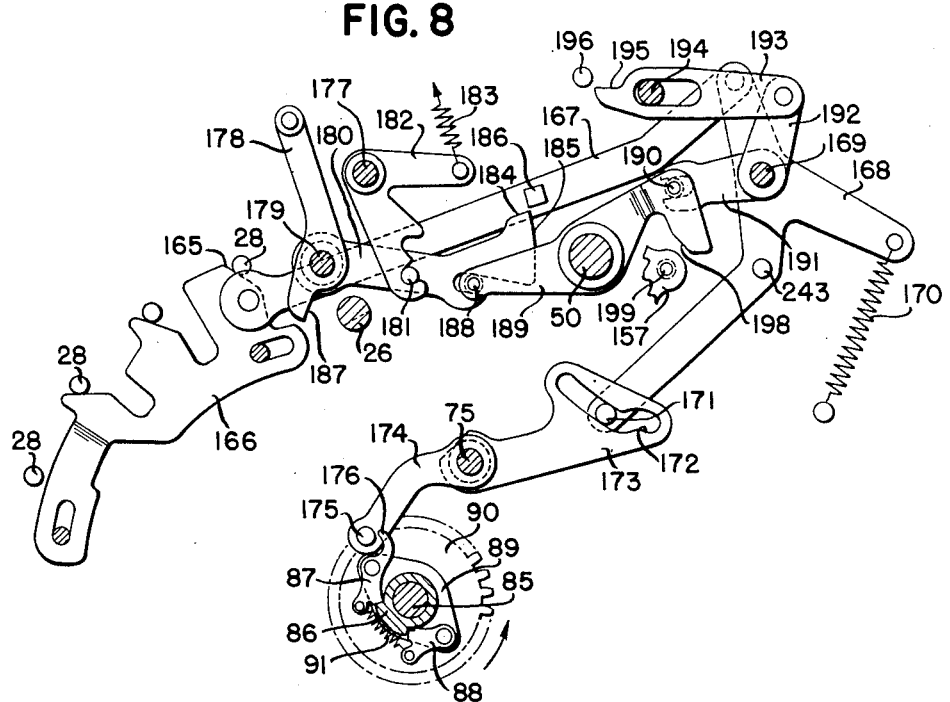
Fig. 8 is a right side elevation of the mechanism for controlling the record material printing and feeding mechanisms in certain types of machine operations.

With the parts in the condition described above, the driving pawl 87 will remain in operating engagement with the lug 86, as shown in Fig. 8, and consequently the cam 84 (Fig. 9) and the cylinder 154 (Fig. 1) will function in the manner described above to issue a ticket.

It will be noted, by referring to Figs. 6 and 8, that the control slide 166 has no camming surface 165 for the stud 28 in the "List" transaction key 24; consequently depression of said key will not impart any shifting movement to said slide, and, as a result, the stud 175 will remain in the path of the finger 176 so that initial movement of the gear 90 and the plate 89 will cause said finger to engage said stud to rock said pawl 87 out of engagement with the driving lug 86 to disconnect the cam 84 and the cylinder 154 from the driving gear 90 so that said parts will remain stationary during machine operation, and consequently no ticket will be issued.

As rotation of the gear 90 and the plate 89 causes the finger 176 to move out of engagement with the stud 175, the spring 91 returns the pawl 87 counter-clockwise into engagement with the periphery of the lug 86, where said pawl rides idly during the remainder of machine operation until it is again brought into engagement with its corresponding shoulder on the lug 86 at the same time the retaining pawl 88 drops into the path of its shoulder of said lug.

Listing mechanism

A manually operable listing lever 178 (Fig. 8) is used in conjunction with the "List" transaction key 24 to further control the printing and issuing of tickets.

The lever 178 is secured to a hub free on a stud 179 secured in the right machine frame. Also secured to said hub is a companion arm 180 carrying a stud 181, which coacts with two locating notches in a retaining pawl 182 free on a shaft 177 journaled in the machine framework, and urged counter-clockwise by a spring 183 to cause said notches, in cooperation with said stud, to yieldingly retain the arm 180 and the lever 178 in either of their two positions. Shifting the listing lever 178 from its ineffective position, as shown in Fig. 8, counter-clockwise to its effective position carries the arm 180 in unison therewith, to move an arcuate surface 185 on said arm into the path of a square stud 186 in the link 167, to obstruct forward movement of said link and the slide 166, thus causing the camming surfaces 165 on said slide, in cooperation with their corresponding studs 28, to obstruct depression of the transaction keys 21, 22, or 23.

Conversely, depression of one of the transaction keys 21, 22, or 23 shifts the slide 166 and the link 167 forwardly to move the stud 186 into the path of an upper surface 184 on the arm 180 to obstruct counter-clockwise movement of said arm and the lever 178, to retain them in their ineffective positions. A downward extension 187 of the lever 178 coacts with the rod 26 to limit counter-clockwise movement of said lever and connected mechanism. Obstructing of the forward movement of the link 167 by the arm 180, as explained above, also insures that the arms 173 and 174 and the stud 175 will remain in effective positions, as shown in Fig. 8, to disable the ticket-issuing mechanism.

Counter-clockwise movement of the arm 180 (Fig. 8) causes a slot therein, in cooperation with a stud 188 in a lever 189 free on the shaft 50, to rock said lever clockwise. Clockwise movement of the lever 189 causes a stud 190 carried thereby, in cooperation with a slot in a crank 191 secured on the shaft 169, to rock said crank and said shaft, and another crank 192 secured on said shaft, counter-clockwise. The upper end of the crank 192 is pivotally connected to the rear end of a slide 193, having a slot which engages a stationary stud 194 to assist said crank in shiftably supporting said slide. Counter-clockwise movement of the crank 192 shifts the slide 193 forwardly to move a surface 195 thereon beneath a stud 196 in a crank 197 (Fig. 1) secured to the tension roller shaft 115, to obstruct clockwise movement of said shaft and the pressure rollers 114 to retain said rollers in their ineffective position when the listing lever 178 (Fig. 8) is in its forward or effective position.

It is likewise desirable that movement of the listing lever 178 to effective position will disable the impression hammer 157 for the tickets and the insertable slips. This is effected by clockwise movement of the lever 189 (Fig. 8), which causes a control surface 198 on a downward extension of said lever to latch over a stud 199 in the hammer 157 and carry said hammer forwardly a slight distance out of coacting relationship with the hammer operating mechanism. It is therefore evident that, when the lever 178 is in its forward or effective position, the hammer 157 will be retained inoperative, which is a desirable condition in cases where the ticket-issuing and slip-feeding mechanism is disabled.

Duplicate slip mechanism

In certain types of transactions, it is desirable to prepare a duplicate copy of the slip shown in Fig. 2, and this is done in the operation immediately succeeding the operation in which the original slip was prepared. As such succeeding operation is substantially a repetition of the immediately preceding operation, it is desirable to control the machine accordingly, and this is effected by the proper use of a duplicate deposit lever 201 (Fig. 6), which, when moved to effective position, locks the transaction keys 21 to 24 against depression, causes the totalizer engaging mechanism to be non-added or rendered inoperative, unlocks the machine releasing mechanism, and renders the ticket issuing mechanism inoperative.

The duplicate deposit lever 201 (Figs. 6 and 7) is rotatably supported on the rod 26, said lever being shown in its normal or ineffective position. Moving the lever 201 counter-clockwise from ineffective position to effective position causes a surface 202 thereon, in cooperation with a stud 203 in an upward extension of the control plate 29, to shift said plate counter-clockwise against the action of the spring 30 to rock the arm 32 clockwise out of the path of the release yoke 34, so that the machine may be released for operation without the depression of one of the transaction keys 21 to 24.

Likewise, clockwise movement of the lever 201 causes a stud 204 therein, in cooperation with a slot in the lower end of a crank 205 secured on the shaft 177, to rock said crank, said shaft, and an arm 206 (Fig. 7), also secured on said shaft, clockwise. Clockwise movement of the arm 206 causes a stud 207 carried thereby, in cooperation with a slot formed in a hook-shaped portion of a detent 208, to shift said detent counter-clockwise. The detent 208 is mounted for shiftable movement in the key frame 25 by means of concentric slots therein in cooperation with fixed studs in said frame. The control plate 29 (Fig. 6) is located on the right-hand side of the stems of the transaction keys 21 to 24, while the detent 208 is located on the left-hand side of said key stems. The key studs 28 extend on both sides of the corresponding keys, and said detent 208 lies directly beneath the left-hand extensions of said studs. Counter-clockwise movement of the detent 208 (Fig. 7) moves a peripheral surface 209 thereon beneath and in the path of the studs 28 in the keys 21 to 24 to obstruct depression of said keys when the lever 201 is in effective position. When the lever 201 and the detent 208 are in normal position, as shown here, slots 210 in said detent are located opposite each of the studs 28 in the keys 21 to 24 to provide clearance for said studs, so that said keys may be depressed. Depression of any one of the keys 21 to 24 causes its stud 28, in cooperation with the corresponding slot 210, to secure the detent 208 and the lever 201 in normal positions and consequently prevents movement of said lever 201 to effective position.

Counter-clockwise movement of the detent 208 (Fig. 7) causes a stud 211 in its lower end, in cooperation with an angular nose on a latch 213 free on the key release shaft 33, to rock said latch clockwise against the action of a spring 214. Clockwise movement of the latch 213 causes a rearward extension 215 thereof to move into the path of the bail of the release yoke 34 to obstruct clockwise releasing movement of said yoke while said lever 201 is being moved to effective position.

Near the end of the counter-clockwise movement of the detent 208, a flat surface on the stud 211 by-passes a shoulder 212 on the latch 213, whereupon the spring 214 immediately restores said latch counter-clockwise to normal position, in which the extension 215 is above and out of the path of the bail of the release yoke 34 and in which the shoulder 212 overlies the stud 211 and retains said detent 208 and the lever 201 in their moved or effective positions during machine operation.

Near the end of machine operation, the key release shaft 33 is rocked first clockwise and then back to normal position, in the well-known and usual manner, causing a releasing finger 216 fast thereon, in cooperation with a stud 217 in the latch 213, to rock said latch clockwise to disengage the shoulder 212 from the stud 211 to permit the detent 208 and the lever 201 to be spring-returned to normal positions.

Moving the total control lever 65 (Fig. 7) out of "Add" position, as shown here, to either "Read" or "Reset" position rocks the shaft 35 and an arm 218 fast thereon counter-clockwise, in the well-known manner, to move a bent-over portion on the upper end of said arm into the path of a downward surface 219 on a rearward extension of the detent 208, to obstruct counter-clockwise movement of said detent, to render the lever 201 inoperative in reading and resetting operations. On the contrary, counter-clockwise movement of the detent 208 places the extension 219 in the path of the bent-over portion of the arm 218 to prevent movement of the total control lever 65 out of Add position, after said detent and the lever 201 have been moved to effective positions.

In duplicate deposit or slip operations, it is necessary that all the totalizers be non-added, so that, when the amount of the preceding operation is repeated, it will not be entered in any of said totalizers.

Counter-clockwise movement of the lever 201 (Figs. 6 and 7) causes a stud 221 in a forward extension thereof, in cooperation with a cam slot in the upper arm of a lever 222 free on the shaft 37, to rock said lever clockwise, causing a bent-over ear 223 on a downward arm thereof, in cooperation with a stud 224 in the totalizer engaging link 225, to rock said link downward or clockwise a slight distance to ineffective or non-adding position.

The lever 201 (Fig. 6) has a rearwardly-extending finger 226, which coacts with a stud 227 in an arm 228 secured on a shaft 229 journaled in the machine framework. Also secured on the shaft 229 is an arm 230 carrying a stud 231, which engages a slot in a forward extension of a cam arm 232 free on the shaft 100, said arm 232 normally maintained in yielding engagement with a rod 233, mounted in the machine framework, by a spring 234 (Fig. 7) connected at its lower end to said arm 230. The spring 234 urges the arm 230, the shaft 229, and the arm 228 counter-clockwise, causing the stud 227, in cooperation with the finger 226, to yieldingly retain the lever 201 in normal or home position, as shown here, and to yieldingly resist movement of said lever to effective position. Movement of the lever 201 counter-clockwise to effective position causes the camming surface on the finger 226, in cooperation with the stud 227, to rock the arm 228, the shaft 229, and the arm 230 clockwise, against the action of the spring 234. The arm 230 in turn rocks the cam arm 232 counter-clockwise, to move a high portion 235 thereof beneath the stud 103 in the link 73 to maintain the arm 72 in its upward position, as shown in Fig. 6. This, under ordinary circumstances, would permit the pawl 80 (Fig. 9) to move into the path of the ear 105 to effect a short feed of the slip in the manner explained previously. However, this particular control of the ticket and slip feeding mechanism is nullified in duplicate slip operations by the stud 175 (Fig. 6), which remains in the path of the finger 176 on the pawl 87 and disconnects said pawl from the driving lug 86 to disable the drive of the cam 84 (Fig. 9) and the ticket feed cylinder 154 (Fig. 1) to prevent the issuing of a ticket in this type of operation. As the cam 84 does not revolve in duplicate slip operations, the high portion of its periphery 83 remains in engagement with the lower end of the lever 82, as shown in Fig. 9, and causes said lever to retain the pawl 80 in its clockwise or ineffective position, as shown here; consequently, the segment 106 is not restricted in its feeding movement and imparts a long feed to the duplicate deposit slip. In the present adaptation, clockwise movement of the arm 228, the shaft 229, and the arm 230 (Fig. 6) is utilized to disable the consecutive number advancing mechanism in the usual and well-known manner, so that the consecutive number of the preceding operation will be duplicated on the duplicate slip.

In duplicate slip operations, after the lever 201 (Fig. 6) has been moved to effective position, operation of the machine is initiated by depression of the "Repeat" key to cause the amount of the immediately preceding operation to be repeated and the values and other information in connection therewith recorded twice upon the duplicate slip.

Read and reset control mechanism

Moving the total control lever 65 (Fig. 7) from "Add" position to either "Read" or "Reset" position causes the teeth in the segment 68 to rock the cam 69 counter-clockwise to bring a node 237 on the periphery of said cam into engagement with a roller 238 on the upper end of an arm 239, free on the shaft 229, to rock said arm clockwise. Clockwise movement of the arm 239 causes a stud 240 carried thereby, in cooperation with a slot 241 (Figs. 6 and 7) in the arm 228, to carry said arm clockwise in unison therewith to rock the high portion 235 of the arm 232 beneath the stud 103 to obstruct sensing movement of the arm 72 to effect a short feed of the tickets in reading and resetting operations, in the manner explained earlier herein in connection with the mechanism shown in Fig. 9. As in duplicate deposit operations, clockwise movement of the arm 228, the shaft 229, and the arm 230 (Figs. 6 and 7) disables the consecutive number advancing mechanism in reading and resetting operations.

The forward end of a link 242 (Fig. 7) is pivotally connected to the stud 240, and the rear end of said link is slotted to receive a stud 243 in the lever 168, and, due to this connection, clockwise movement of said arm 239 rocks the lever 168 counter-clockwise, causing the stud 171 (Fig. 8), in cooperation with the slot 172, to rock the arm 173, the shaft 75, and the arm 174 clockwise to move the stud 175 out of the path of the finger 176, so that the pawl 87 will remain effective to drive the cam 84 and the cylinder 154 (Fig. 1) in the manner explained earlier. Counter-clockwise movement of the lever 168 (Fig. 8) shifts the link 167 forward to move the stud 186 over the surface 184 to obstruct counter-clockwise movement of the arm 180 and the listing lever 178 so that said lever cannot be moved to effective position in reading and resetting operations.

In reading and resetting operations, rotation of the cam 84 (Fig. 9) causes the camming surface 83, in cooperation with the lever 82, to release the pawl 80 to the action of the spring 79, which rocks said pawl counter-clockwise to move the shoulder 194 into the path of the ear 105 to restrict the feeding movement of the segment 106 to effect a short feed of the ticket, to cause the two impressions on the issuing ticket to be closely spaced to assist in identifying reading and resetting operations.

OPERATION

The machine chosen to illustrate the present invention is disclosed as arranged for use by tellers in banking establishments. However, it is not the desire to limit the machine to any particular use, as its inherent flexibility and many desirable and essential features readily adapt said machine for use in connection with various other business systems where records are kept and receipts are issued for values deducted from or credited to the accounts of customers or patrons.

In using the machine in connection with a deposit made by a checking account customer, first, the customer makes out a deposit slip, similar to that shown in Fig. 2, in the usual manner by inserting his name and the date in the proper places provided therefor and then classifies his deposit by entering the amount of currency ($25.00) in the space provided therefor, the amount of silver ($15.00) in the space provided therefor, and then the checks, one for $30.25 and the other for $40.50, in the spaces provided for the checks. After all the items of deposit are entered on the deposit slip, the customer totals these items and enters the total ($110.75) in the space provided therefor at the bottom of the slip. The customer then presents the deposit slip 63, together with the items to be deposited, to the teller, who properly inserts said slip into the chute 143 (Fig. 1), sets up the total amount of the deposit ($110.75) on the amount keys, depresses the "Deposit" key 21 to select the deposit totalizer to receive the amount of the deposit, and initiates machine operation by depressing the release or starting bar.

During operation of the machine, the first operation of the impression mechanism prints the date (May 10–11), the amount of the deposit ($110.75), the consecutive or serial number (735), and an identifying number (12) for the teller in the space provided therefor near the center of the ticket 61 (Fig. 3), and, at the same time, a duplicate of the amount, serial number, and teller's number is printed upon the detail strip 56 (Fig. 5). The second operation of the impression mechanism prints the identical data on the upper edge of the slip 63 (Fig. 2), and, after the machine operation has been completed, the teller removes the ticket and the slip from the chute 143 and gives the ticket 61 to the customer as a receipt for the deposit, thus eliminating the use of a pass book.

This ends the transaction as far as the customer is concerned. However, in the system being described, it is required that the teller keep a separate account of all cash taken in, and, in complying, he counts the cash ($40.00), enters this amount on the amount keys, depresses the "Cash-In" key 22 to identify this as a cash-in transaction and to select the cash-in totalizer to receive the amount, and initiates operation of the machine by depressing the starting bar. During machine operation, a ticket 62, similar to that shown in Fig. 4, is issued, and, during the first operation of the impression mechanism, the date (May 10–11), the amount of the cash ($40.00), an identifying symbols (star), the serial number (736), and the teller's number (12) are printed at 162, near the center of the ticket, and a duplicate of this data, except the date, is simultaneously printed upon the detail strip. During the second operation of the impression mechanism, a duplicate impression of the data pertaining to the transaction is printed near the top edge of the ticket on top of the statement, "This Is a Receipt for Your Deposit," so as to cancel said statement and identify this as a cash-in ticket. The teller then places the deposit slip, the cash-in ticket, and the checks in a proper receptacle for use by the "Proof Department," and the cash, which has been properly charged to the teller's account, is placed with his general supply of cash for use in the cashing of checks and other disbursements.

In deposit transactions where no cash is involved—that is, where the total amount of the deposit is represented by one or more checks—the cash-in operation, in which the ticket 62 (Fig. 4) is issued, is eliminated, and only the deposit operation involving the ticket 61 (Fig. 3) and the slip 63 (Fig. 2) are involved.

In deposit transactions involving cash paid out, such as, for example, when a customer wishes to deposit $150.00 and tenders a check for $200.00, the deposit slip is inserted into the machine as before, and the amount of the deposit ($150.00) is set up on the amount keys, after which the "Deposit" key 21 (Fig. 6) is depressed, and machine operation is initiated by depression of the starting bar.

During machine operation, a ticket similar to that shown in Fig. 3 is issued, having the amount of the deposit and other data thereon, and a duplicate recording of the data is printed upon the upper edge of the deposit slip, exactly as explained before. At the end of the deposit operation, the operator removes the ticket and slip from the machine, gives the ticket to the customer as a receipt, and again places the deposit slip in the machine with the right-hand edge disposed downwardly. The amount of the cash to be paid out ($50.00) is then set up on the amount keys, the "Cash-Out" key 23 (Fig. 6) is depressed to select the cash-out totalizer to receive the amount, and operation of the machine is initiated by depression of the starting bar. During machine operation, a ticket similar to that shown in Fig. 3 is issued, having the amount of the cash paid out ($50.00) and other related data printed thereon, and, in the same operation, a duplicate recording of the data printed on the ticket is printed along the right-hand edge of the deposit slip, as indicated at 244 (Fig. 2). The operator then counts out the cash ($50.00), verifying the amount by checking it with the indication, gives the cash to the customer, and places the deposit slip and the paid-out ticket in the receptacle for use by the "Proof Department."

Certain business systems require that a duplicate deposit slip be retained by the customer, and, assuming that such is the case in the deposit transaction explained above, at the end of the deposit operation, in which the amount of the deposit ($110.75) was recorded upon the ticket or receipt 61 and the slip 63, the operator inserts the duplicate deposit slip in the machine, moves the duplicate deposit lever 201 (Fig. 6) forwardly, and initiates a repeat operation by depressing the "Repeat" key. During the repeat operation, the total amount of the deposit ($110.75) is repeated and recorded upon the upper edge of the duplicate deposit slip, and a symbol identifying this as a duplicate deposit operation is printed immediately to the right of the amount. It will be recalled that moving the duplicate deposit lever 201 to effective position non-adds all of the totalizers and disables the ticket-issuing mechanism; consequently this is a printing operation only, in which the identical amount of the preceding deposit operation is printed upon the duplicate deposit slip without the necessity of again setting up said amount on the amount keys. It will also be recalled that, in duplicate deposit transactions, the advancing mechanism for the consecutive number or serial number is rendered inoperative by movement of the duplicate deposit lever 201 to effective position; consequently, in this operation the serial number printed upon the original deposit slip is repeat-printed upon the duplicate deposit slip to further identify said slip.

Deposit transactions involving a number of checks deposited at the same by one customer or depositor are usually handled as a single transaction, much the same as explained in connection with the deposit slip shown in Fig. 2, in which the checks were listed separately and the total value of said checks entered at the bottom of said deposit slip. However, there are cases in which it is desirable to enter or list each of the several checks separately on the machine and accumulate a total thereof in the listing totalizer, after which said totalizer is cleared or reset to obtain the total value of said checks, and in a subsequent deposit operation the total value is repeated so that it may be recorded upon an issuing ticket, similar to that shown in Fig. 3, and upon the deposit slip, at the same time said amount is entered in the deposit totalizer.

In transactions where it is desired to list each check separately, the listing lever 178 (Figs. 6 and 8) is moved forwardly to effective position, and the "List" key 24 (Figs. 6 and 8) is depressed to select the listing totalizer to receive the value of each check as it is listed. In subsequent listing operations, the amount of each check is set up on the amount keys and listed separately on the detail strip 56 (Fig. 5) at the same time said amount is added into the listing totalizer. It will be recalled that moving the listing lever 178 to effective position disables the printing and feeding mechanisms for both the ticket and the slip; so consequently, in such operations, the only record that is made is made upon the detail strip, upon which a duplicate of all other transactions is also recorded. After the last check has been listed, the total control lever 65 is moved to "Reset" position, and in a reset operation the listing totalizer is cleared and the total amount therein stored in the secondary portions of the amount differentials and indicating mechanism.

In the following deposit operation, the operator moves the total control lever 65 to "Add" position, inserts the deposit slip in the chute, depresses the "Deposit" key 21 (Fig. 6), and initiates machine operation by depressing the "Repeat" key. During this repeat operation, the amount stored in the secondary portions of the amount differentials is repeated and recorded upon the ticket and upon the upper edge of the deposit slip.

There are various other ways in which the listing totalizer may be used to advantage in connection with banking systems, and therefore it is desirable that this totalizer be kept free for use in this manner rather than restricting it to some particular use, as are the other totalizers.

Withdrawals and cashed checks are treated the same as cash-out transactions, and in either case the withdrawal slip or the check being cashed is inserted into the slip chute, the "Cash-Out" key 23 is depressed, and machine operation is initiated by depression of the starting bar. During machine operation, the amount of the cash paid out is printed, first upon the ticket and then upon the withdrawal slip or check, as the case may be, after which the cash is counted out and presented to the customer, and the verified withdrawal slip or cashed check and the paid-out ticket are placed in the receptacle for use by the "Proof Department."

While the form of the invention shown and described herein is admirably adapted to fulfill the objects primarily stated, it is to be understood that it is not intended to confine the invention to the one form or embodiment disclosed herein, for it is susceptible of embodiment in various other forms.

What is claimed is:

1. In a machine of the class described, having means to print records on record material and constructed and arranged to perform printing and non-printing operations, the combination of primary means to feed the record material in relation to the printing means; secondary means to feed the record material in relation to the printing means; means normally effective to render the primary feeding means inoperative; control elements; means including a link operated by certain ones of the control elements to disable the rendering means for the primary feeding means to cause the record material to be fed in printing operations; a control member operable in conjunction with another one of the control elements; means including an arm, a lever, and a slide operated by the member to disable the printing means and the secondary feeding means in non-printing operations; and a projection on the link coacting with the arm to prevent operation of the control member when the disabling means is effective, and to prevent operation of said disabling means and the certain control elements when said member is in operated condition to control the printing and feeding of the record material in printing and non-printing operations.

2. In a machine of the class described, having printing means, including a printing hammer to print records on record material, and constructed and arranged to perform one type of operation in which records are printed on the record material, and another type of operation in which no records are printed on the record material, the combination of means to advance the record material to the printing means; means to feed the record material in relation to the printing means; means normally effective to render the advancing means inoperative; control elements to control the machine to perform operations in which records are printed on the record material; means including a control element and a control member operable in conjunction with each other to condition the machine to perform an operation in which no records are printed on the record material; means including a link operable by the first control elements to disable the rendering means for the advancing means; an arm connected to the control member and operable in unison therewith; a lever connected to the arm and operable by the control member to disable the printing hammer; means including a slide connected to the lever and operable by the control member to disable the feeding means; and coacting elements on the link and the arm to prevent operation of the first control elements and the disabling means when the control member is in operated condition, and to prevent operation of said control member when said first control elements and said disabling means are in operated condition.

3. In a machine of the character described, having means to print records on record material, the combination of feeding means to impart a first feeding movement to the record material; feeding means to impart a second feeding movement to the record material; control elements; means normally effective to render the first feeding means inoperative; disabling means operated by the control elements to disable the rendering means; a control member normally in ineffective position, but movable to an effective position to control the disabling means, the second feeding means, and the printing means; a control part operatively connected to the control member; coacting elements on the control part and the disabling means coacting with each other to obstruct movement of the control member to effective position, when said disabling means is effective, and to obstruct operating movement of said disabling means and the control elements when said control member is in effective position; and means operably connected to the part and effective upon movement of the control member to effective position to disable the printing means and the second feeding means to control the printing and feeding of the record material.

4. In a machine of the character described, having printing means including a printing hammer, to print records on record material, the combination of means to impart a first feeding movement to the record material; means to impart a second feeding movement to the record material; means normally effective to render the first feeding means inoperative; control elements; means including a shiftable link operated by the control elements to disable the rendering means; an operable control member for controlling the operation of the disabling means, the second feeding means, and the printing hammer; means including an arm connected to the member and coacting with the link upon operation of said member to prevent operation of the disabling means by the control elements, said arm having means coacting with the link upon operation of said disabling means to prevent operation of said control member; a lever connected to the arm and effective upon operation of the control member to retain the printing hammer against printing movement; and means connected to the lever and effective upon operation of the control member to disable the second feeding means to control the printing and feeding of the record material.

5. In a machine of the class described, having means including a hammer, to print records on record material and constructed and arranged to perform operations in which records are printed on said record material, and to perform other operations in which no records are printed on said record material, the combination of feeding means to impart a first feeding movement to the record material; feeding means to impart a second feeding movement to the record material; control elements; means normally effective to render the first feeding means inoperative; means including a link operated by the control elements to disable the rendering means; a control member operable to control the disabling means, the second feeding means, and the printing hammer; an arm operatively connected to the member; a lever operatively connected to the arm and effective upon operation of the control member to retain the printing hammer inoperative in operations in which no records are to be printed on the record material; means including a slide operably connected to the lever and effective upon operation of the member to disable the second feeding means in operations in which no records are to be printed on the record material; and coacting elements on the arm and the link coacting with each other to prevent operation of the control elements and the disabling means when the control member is in operated condition and to prevent operation of said control member when the control elements and the disabling means are in operated condition.

6. In a machine of the class described, having printing means to print records on record material, and means to feed the record material in relation to the printing means, said machine constructed and arranged to perform printing and non-printing operations, the combination of means normally effective to render the feeding means inoperative; control elements; operation-determining control means, operable in conjunction with the control elements to determine the type of operation to be performed; means including a link operable by certain ones of the control elements or by the control means to disable the rendering means to cause the feeding means to function; a control member operable in conjunction with another one of the control elements to control the functioning of the printing and feeding means; a projection on the link; and means operatively connected to the control member and coacting with the projection to prevent operation of the disabling means and the certain control elements when said control member is operated, said means also effective to prevent operation of the member when the disabling means is rendered effective, either by said certain control elements or by the control means, to control the printing and feeding of the record material in printing and non-printing operations.

7. In a machine of the class described, having printing means to print records on record material, said machine constructed and arranged to perform printing and non-printing operations, the combination of means to feed the record material in relation to the printing means; means to advance the record material to the feeding means; means made operative by the advancing means to restrict the feeding movement of the feeding means to vary the feeding of the record material in relation to the printing means; means normally effective to render the advancing means inoperative; control elements; operation-determining control means positionable in conjunction with the control elements to determine the type of operation to be performed; means including a projection positioned by and in accordance with the effective control elements; means to sense the position of the projection; means operated by the sensing means and coacting with the restricting means to control the feeding movement of the feeding means according to the effective control element; means operated by the control means when in certain positions to render the sensing means inoperative; a control member operable in conjunction with a certain one of the control elements; means including an arm, a lever, and a slide operated by the member to disable the printing means and the feeding means; means including a link operated by the other control elements to disable the rendering means for the advancing means to make the restricting means controllable by the sensing means; and a prominence on the link coacting with the arm and effective when the control member is operated to prevent operation of the disabling means, the other control elements, and the control means, said prominence and said arm also effective to prevent operation of the control member when said disabling means is made effective either by the other control elements or by the control means, to control the operation of the feeding and printing means in printing and non-printing operations.

MAYO A. GOODBAR.
RUSSELL G. PRATT.

References Cited in the file of this patent
UNITED STATES PATENTS

| Number | Name | Date |
|---|---|---|
| 1,619,796 | Shipley | Mar. 1, 1927 |
| 1,795,509 | Robertson | Mar. 10, 1931 |
| 1,917,332 | Shipley | July 11, 1933 |
| 1,929,652 | Robertson | Oct. 10, 1933 |
| 2,048,200 | Robertson | July 21, 1936 |
| 2,056,485 | Robertson | Oct. 6, 1936 |
| 2,351,541 | Plache | June 13, 1944 |